(12) United States Patent
Menzel et al.

(10) Patent No.: US 7,152,853 B2
(45) Date of Patent: Dec. 26, 2006

(54) MANUALLY OPERATED IMPLEMENT

(75) Inventors: Johannes Menzel, Wernau (DE); Helmut Lux, Waiblingen (DE); Marc Schmid, Oppenweiler (DE); Günter Wolf, Oppenweiler (DE)

(73) Assignee: Andreas Stihl AG & Co. KG (DE)

( * ) Notice: Subject to any disclaimer, the term of this patent is extended or adjusted under 35 U.S.C. 154(b) by 0 days.

(21) Appl. No.: 10/861,839

(22) Filed: Jun. 4, 2004

(65) Prior Publication Data

US 2004/0244207 A1 Dec. 9, 2004

(30) Foreign Application Priority Data

Jun. 7, 2003 (DE) ................................ 103 25 967
Apr. 29, 2004 (DE) ....................... 10 2004 021 080

(51) Int. Cl.
*B25D 17/04* (2006.01)

(52) U.S. Cl. .................. 267/137; 267/136; 173/162.2; 30/381

(58) Field of Classification Search ........ 188/378–380; 267/136, 137; 30/381, 383; 83/801; 123/192.2, 123/192.1; 173/162.2, 162.1, 211, 210
See application file for complete search history.

(56) References Cited

U.S. PATENT DOCUMENTS

| | | | |
|---|---|---|---|
| 4,138,812 A | | 2/1979 | Zimmerer et al. |
| 4,282,938 A | * | 8/1981 | Minamidate ............. 173/162.2 |
| 4,836,297 A | * | 6/1989 | Dorner et al. ........... 173/162.1 |
| 5,046,566 A | * | 9/1991 | Dorner et al. ........... 173/162.2 |
| 6,375,171 B1 | * | 4/2002 | Zimmermann et al. ..... 267/137 |
| 6,446,421 B1 | * | 9/2002 | Kramer et al. ................. 56/233 |
| 6,643,939 B1 | * | 11/2003 | Tajima et al. ................. 30/381 |
| 6,799,642 B1 | * | 10/2004 | Wolf et al. .............. 173/162.2 |
| 2002/0157633 A1 | * | 10/2002 | Menzel et al. ........... 123/192.1 |
| 2003/0183187 A1 | * | 10/2003 | Menzel et al. ........... 123/192.2 |
| 2003/0188618 A1 | * | 10/2003 | Menzel et al. ................. 83/801 |
| 2004/0178551 A1 | * | 9/2004 | Menzel et al. .............. 267/141 |
| 2004/0244207 A1 | * | 12/2004 | Menzel et al. ................ 30/381 |

FOREIGN PATENT DOCUMENTS

| | | |
|---|---|---|
| DE | 44 16 044 | 11/1995 |
| EP | 1 026322 | 8/2000 |
| EP | 1 075350 | 1/2002 |
| GB | 2382856 | 7/2003 |
| GB | 2402361 | * 12/2004 |

* cited by examiner

*Primary Examiner*—James McClellan
*Assistant Examiner*—Bradley T. King
(74) *Attorney, Agent, or Firm*—Robert W Becker & Associates; Robert W Becker

(57) ABSTRACT

A manually operated implement such as a chain saw, a parting-off grinder or similar device has an internal combustion engine to drive a tool and a handle arrangement to operate the implement. The handle arrangement is connected to the internal combustion engine via a vibration damping system, the vibration damping system comprising at least one anti-vibration element. In order to achieve good vibration damping and sufficient operational rigidity in all operating ranges, in at least one direction of vibration in a predetermined frequency range the anti-vibration element has a first characteristic curve in a first state and a second characteristic curve in a second state and the anti-vibration element can be switched between the first state and the second state.

19 Claims, 7 Drawing Sheets

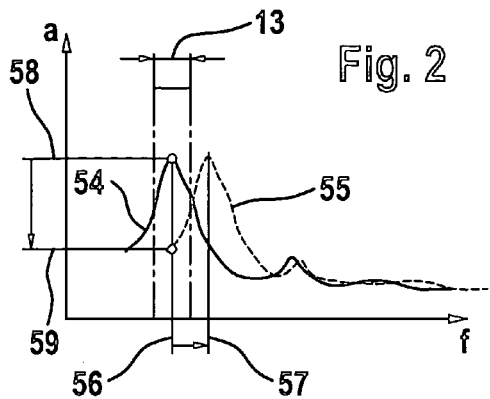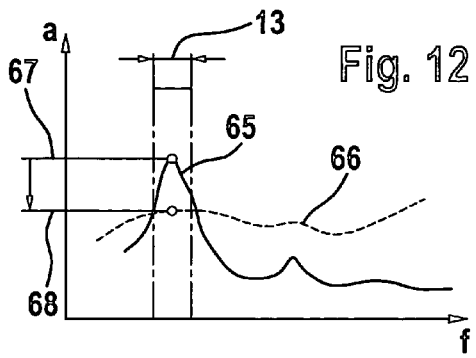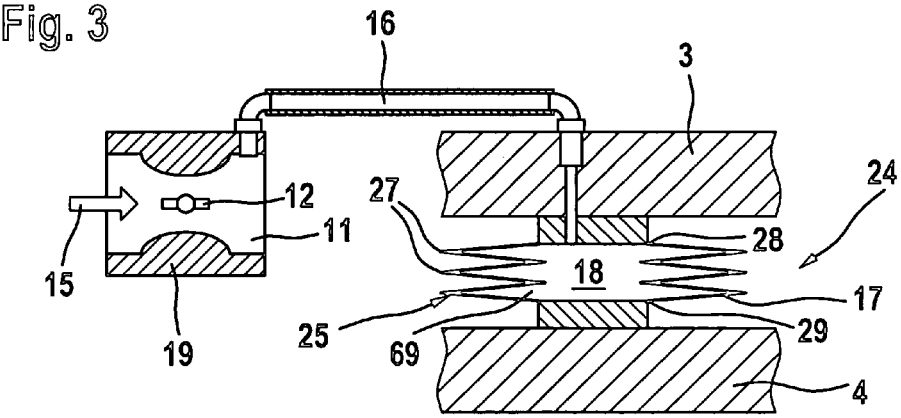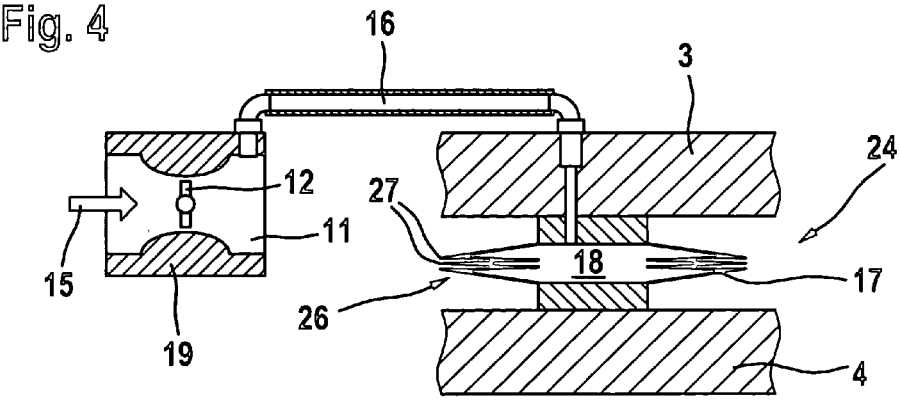

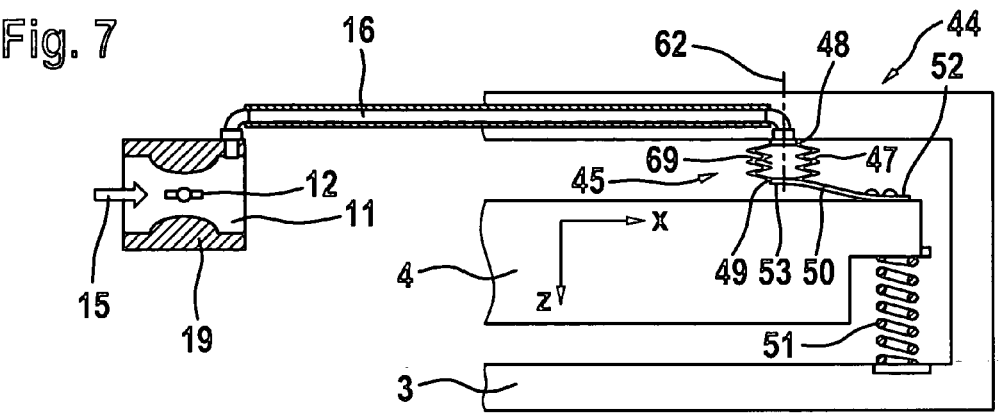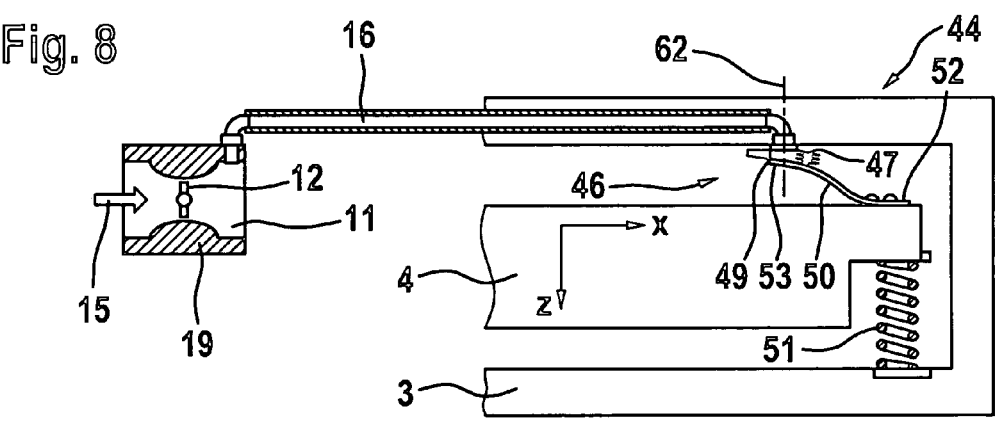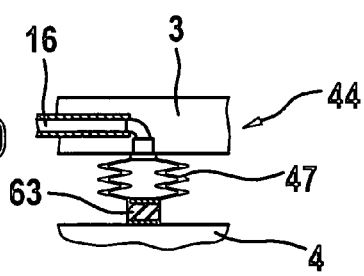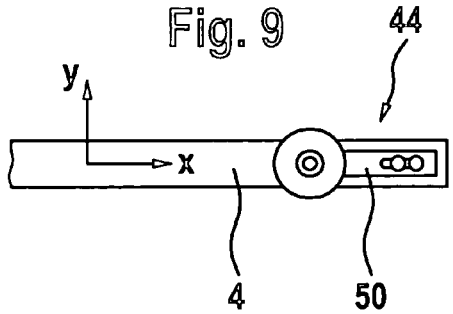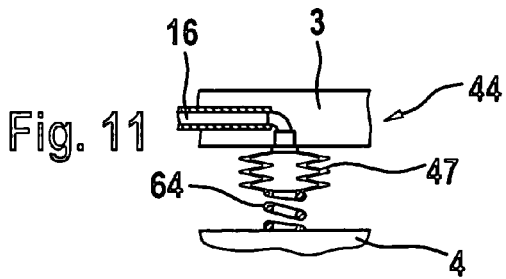

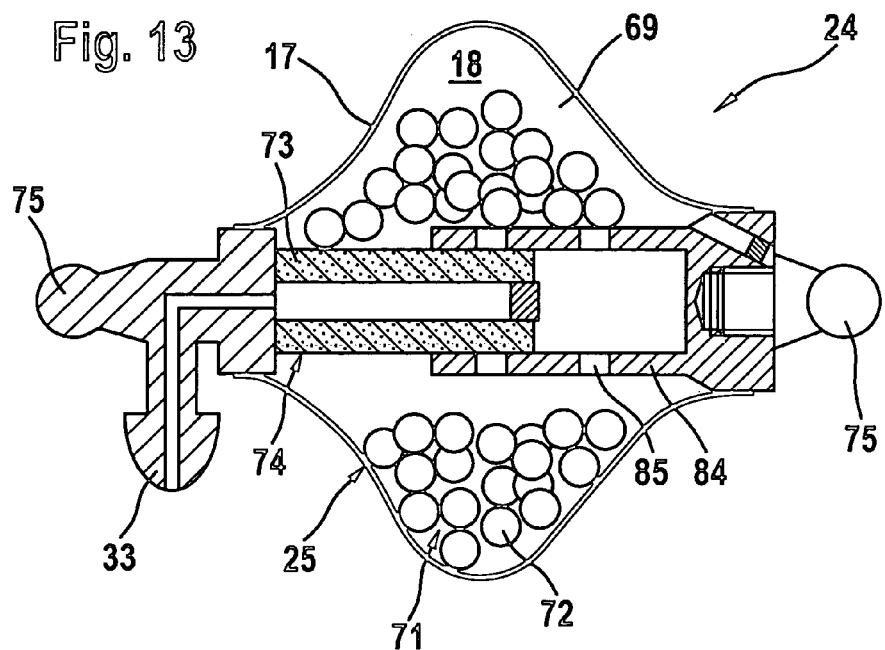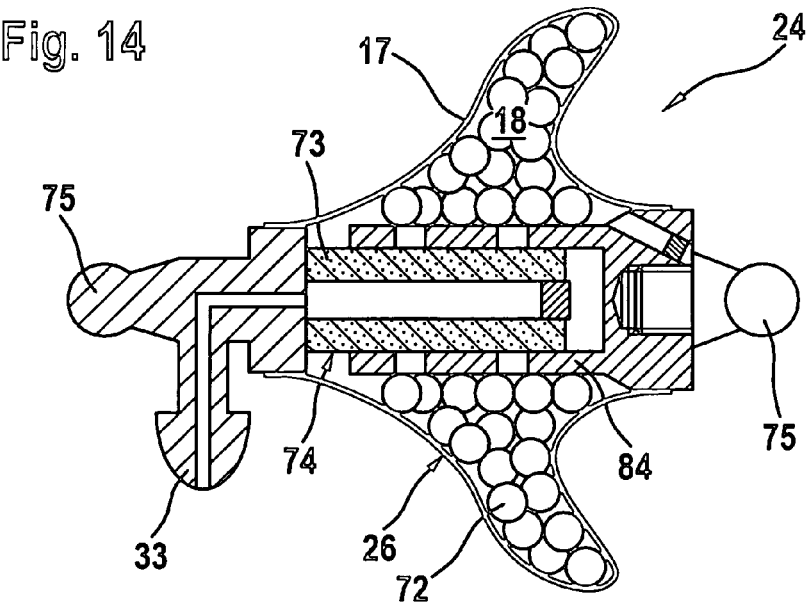

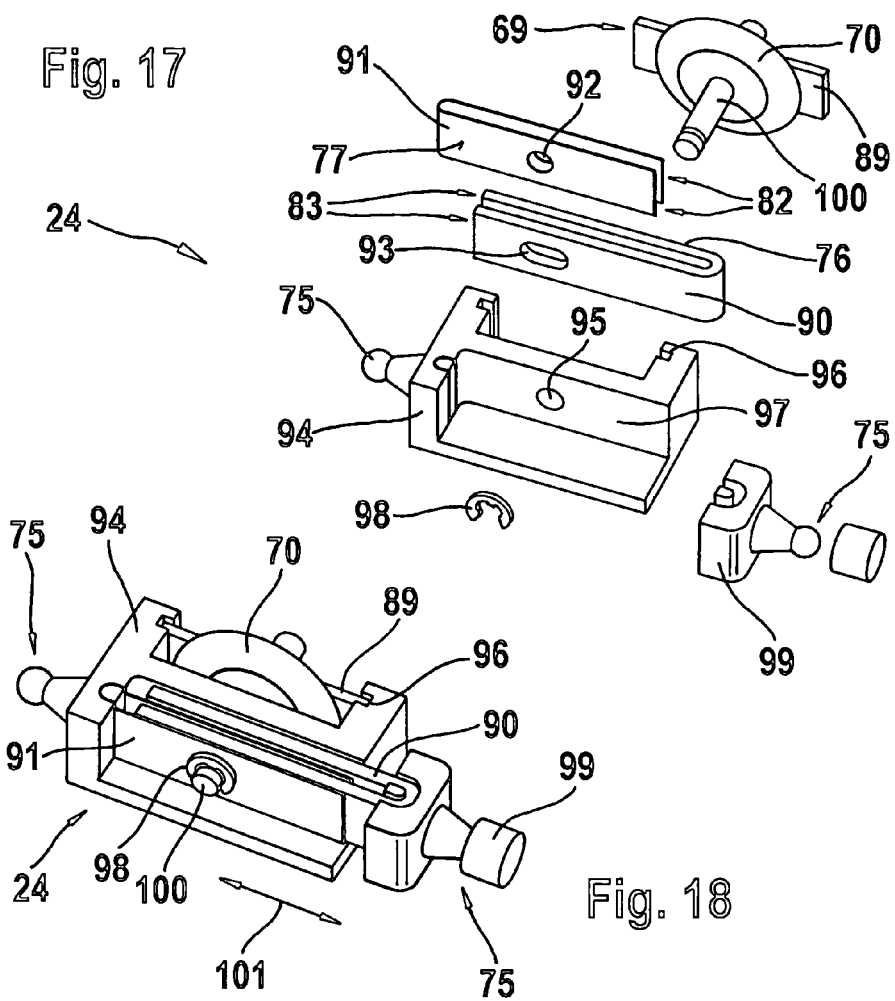
Fig. 17
Fig. 18
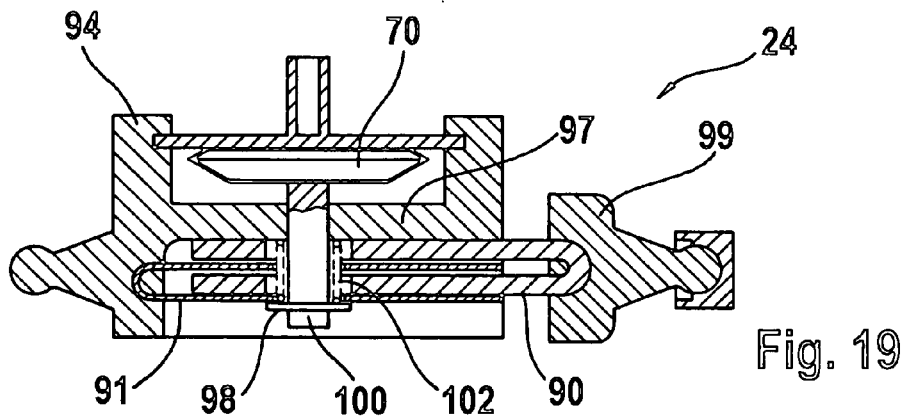
Fig. 19

MANUALLY OPERATED IMPLEMENT

BACKGROUND OF THE INVENTION

The invention relates to a manually operated implement such as a chain saw, a parting-off grinder or similar device having an internal combustion engine for driving a tool.

A chain saw having a handle arrangement which is connected via anti-vibration elements to the housing in which the internal combustion engine is positioned is known from U.S. Pat. No. 4,138,812. In implements of this type the inherent vibrations of the vibration system formed by the handle arrangement and the engine unit lie in the area of the idle speed of 40 to 50 Hertz. This generates increased handle vibrations. Since sufficient operating rigidity must be guaranteed when working with the implement, the anti-vibration elements cannot be made any more non-rigid in order to achieve lower inherent vibrations. Similarly, however, the anti-vibration elements cannot be made any more rigid since this would lead to a shift in the natural frequencies within the range of the excitement of a tool or into the operating range of the first order. Overall this would result in poorer vibration damping.

The object of the invention is to create an implement of the aforementioned general type which has a good damping effect and adequate operating rigidity.

SUMMARY OF THE INVENTION

This object is achieved by means of a tool having an anti-vibration element for connecting a handle arrangement to an internal combustion engine, wherein in at least one direction of vibration and in a prescribed frequency range the anti-vibration element has a first characteristic curve in a first state and a second characteristic curve in a second state, and wherein the anti-vibration element is adapted to be shifted between the first state and the second state.

The possibility of shifting the anti-vibration element between a first and a second characteristic curve means that the characteristic curve can be selected in such a way as to decrease the vibration amplitude of the tool in the predetermined frequency range so that the vibration at the handle arrangement is reduced. Thanks to the shifting of the anti-vibration element, the change in the characteristic curve in the predetermined frequency range does not influence vibration damping in other vibration ranges. This ability to shift means that it is possible to select the state with the most favorable characteristic curve.

The anti-vibration element can advantageously be shifted dependent on engine speed. Since the inherent vibrations of the implement are excited by the speed-dependent engine vibrations, the shifting of the anti-vibration element dependent on engine speed allows good adjustment of the characteristic curve and thus the spring and damping effect in line with inherent vibration and thereby means that any vibrations which occur can preferably be kept low in each operating range of the implement. Here the predetermined frequency range comprises in particular the vibration frequency of the implement when the internal combustion engine is at idle. This means that the inherent vibrations occurring at idle can be significantly reduced without worsening the vibration behavior of the tool in other speed ranges. Here the anti-vibration element is designed such that it is coupled largely powerlessly in the first state and thus has only an incidental influence on the vibration damping behavior of the vibration damping system.

In an advantageous development the anti-vibration element comprises an elastically deformable vacuum reservoir with an interior which is connected to a vacuum source. In this arrangement, the vacuum reservoir acts as an actuator for changing between the two characteristic curve states of an anti-vibration element. In a useful design the vacuum reservoir is designed as a bellows or corrugated sheath. In this context the term corrugated sheath is used to refer to a component which has an outer wall made of an elastic or flexible material which encompasses a preferably air-filled interior. The high elasticity of the corrugated sheath requires only low pressure differentials to create the appropriate deformations. With only low underpressure the corrugated sheath is able to shrink to such an extent that effective damping occurs. In an advantageous variant the vacuum reservoir is designed as in particular a flat vacuum unit which is expediently made of plastic but may also be made of sheet metal or a similar material. Under the effect of a pressure differential the vacuum unit can be deformed essentially in only one direction, while it is essentially rigid in all other spatial directions. A specific and modifiable level of damping can be set in the direction of deformation, while the anti-vibration element is correspondingly rigid in the other spatial directions due to its rigidity. There is therefore a high degree of operating accuracy in these remaining directions.

In particular, the internal combustion engine has an intake duct in which is positioned a flow control element, the vacuum source for the intake duct being downstream of the flow control element. When the internal combustion engine is at idle, the flow control element is closed and underpressure is therefore created downstream of the flow control element. This underpressure is used to take in air from the interior of the corrugated sheath. The intake air causes the outer wall of the corrugated sheath to contract and in particular the folds of the corrugated sheath to lie adjacent to one another. Depending on the design, the adjacent folds lead to increased friction and thus to a greater damping effect and/or to an increase in the rigidity of the element. Preferably, one end of the corrugated sheath is connected to the internal combustion engine and the other end of the corrugated sheath is connected to the handle arrangement.

It may be advantageous for the anti-vibration element to comprise a spring element. It is provided that one end of the spring element is connected to an end of the corrugated sheath and the other end of the spring element and of the corrugated sheath are connected to the internal combustion engine or the handle arrangement. In the first state, if there is no underpressure in the intake duct, the handle arrangement is coupled non-rigidly to the internal combustion engine via the corrugated sheath. In this state, the anti-vibration element has a first characteristic curve. In this arrangement, the spring and damping effect of the anti-vibration element is very low. When the flow control valve is closed, air is taken in from the corrugated sheath causing the corrugated sheath to contract. The spring element compensates for this travel. If the spring element is fixed rigidly on both sides the corrugated sheath is connected in series with the spring element which leads to an increased damping effect. In this state the anti-vibration element has a second characteristic curve. In this arrangement, the spring element is expediently a coil spring, a rubber spring and/or a leaf spring. It may, however, also be useful for the spring element to be a bar. The bar is mounted in such a manner that it is able to move in particular in the direction of movement of the corrugated sheath. The anti-vibration element is advantageously positioned in a gap between a component which is connected to the internal combustion engine and a component which is connected to the handle arrangement, the bar spanning the gap when the anti-vibration element is in the second state. In the second state the damping effect along the bar is thus created by the corrugated sheath while the damping effect in a plane at right angles to the bar is created by the bar itself. This allows different damping effects to be created in different directions of movement.

In an advantageous design the interior of the vacuum reservoir is filled with a damping material. When underpressure is applied, the interior of the vacuum reservoir is reduced in size as a result of which the damping material is compressed. In its uncompressed state, the damping material has no or only a slight damping effect. As the deformation of the vacuum reservoir and thus the degree of compression of the damping material increases, the damping effect of the damping material also increases thereby achieving effective damping control by simple means. The damping material is expediently a granulated material. The damping effect is essentially created by friction between the grains of the granulated material. The friction and therefore the damping effect of the grains of the granulated material are provided reliably over a long operating period.

In an advantageous development a filter element is positioned between the interior of the vacuum reservoir and the vacuum source, in particular between the interior and a connection opening into the interior. Any wear on the damping material, which may occur as a result of friction between the granules of the granulated material, is reliably kept away from the vacuum source. Pollution is also avoided.

In a useful development a linearly mounted guide element is provided on the inside of the vacuum reservoir, the guide element in particular being represented by the filter element. The elastic damping effect of the appropriately designed anti-vibration element can be limited to one axial direction by simple means while providing an essentially rigid guide at right angles thereto.

The anti-vibration element expediently has at least two adjoining friction surfaces, the vacuum reservoir being positioned to control the contact pressure of the friction surfaces. In this arrangement, the vacuum reservoir does not act as a damping element itself but rather serves as an actuator for variable contact between two friction surfaces. Good reproducibility of the frictional damping effect is provided dependent on the prevailing underpressure.

In an advantageous design the friction surfaces take the form of a cylinder element and a clamping collar which surrounds the cylinder element with friction, the vacuum reservoir being positioned between two legs of the clamping collar. Damping mobility is provided in the axial direction of the cylinder element. The elastic clamping collar which surrounds the cylinder element on all sides gives a high friction effect at low actuating power. The entire arrangement may be designed to be both space- and cost-saving. In an expedient variant the friction surfaces take the form of at least two and in particular several laminate layered friction plates, the vacuum reservoir being provided to control the contact pressure between the friction plates. At a give, available underpressure and at a given size and thus a given efficiency of the vacuum reservoir it is possible to adjust the desired damping effect simply at the design stage by means of the number of layered laminate friction plates.

It is advantageous to position a joint and in particular a ball-and-socket joint on either side of the anti-vibration element. There is a predetermined line of influence between the two joints in which the anti-vibration element acts. Transverse forces are avoided. The effect of the anti-vibration element can be limited precisely to a predetermined assembly direction.

Embodiments of the invention are explained below with reference to the drawing, in which:

FIG. 2 shows a diagram illustrating the amplitude of the inherent vibration plotted against the frequency;

FIG. 3 shows a schematic representation of an anti-vibration element in a first state;

FIG. 4 shows the anti-vibration element illustrated in FIG. 3 in a second state;

FIG. 7 shows a schematic representation of an anti-vibration element in the first state;

FIG. 8 shows the anti-vibration element illustrated in FIG. 7 in the second state;

FIG. 9 shows a top view of the anti-vibration element illustrated in FIG. 8;

Figure 15:
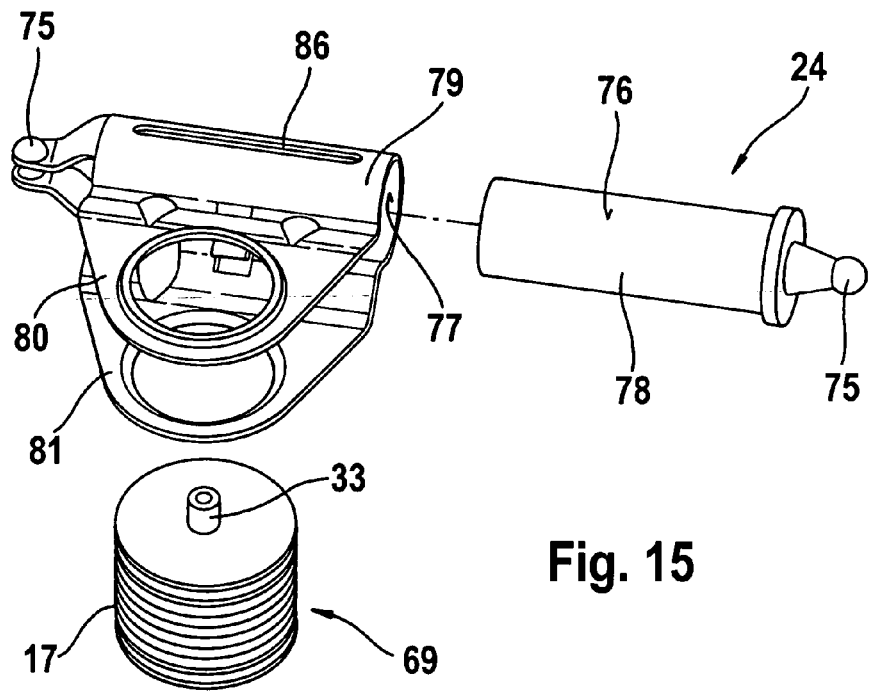
Figure 16:
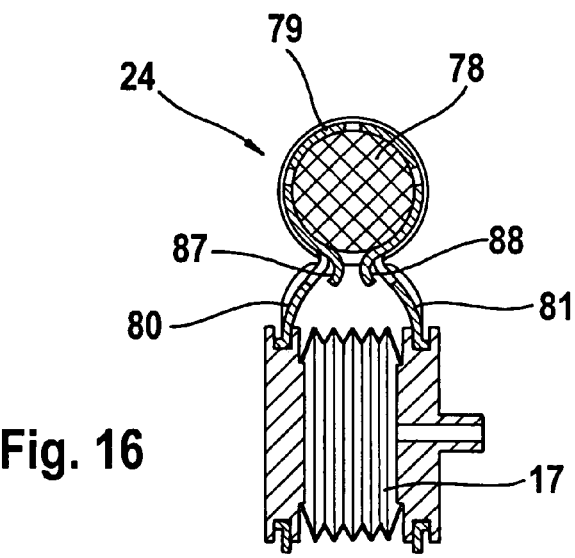

FIGS. 10/11 show schematic representations of variants of the anti-vibration element illustrated in FIG. 7;

FIG. 12 shows a diagram which illustrates the amplitude of the inherent vibration plotted against the frequency;

FIG. 13 shows a variant of the anti-vibration element as illustrated in FIGS. 3 and 4 with a filling of granulated material in the uncontracted position;

FIG. 14 shows the arrangement illustrated in FIG. 13 under the effect of underpressure;

FIG. 15 shows an exploded perspective view of a further variant of the anti-vibration element with a cylinder element and a vacuum-controlled clamping collar;

FIG. 16 shows a cross-sectional view through the arrangement illustrated in FIG. 15;

FIG. 17 shows an exploded perspective view of an embodiment of an anti-vibration element with a vacuum unit and layered laminate friction plates;

FIG. 18 shows the arrangement illustrated in FIG. 17 in the assembled state; and FIG. 19 shows a longitudinal sectional view of a variant of the arrangement illustrated in FIG. 18 with a compression spring.

DESCRIPTION OF SPECIFIC EMBODIMENTS

Figure 1:
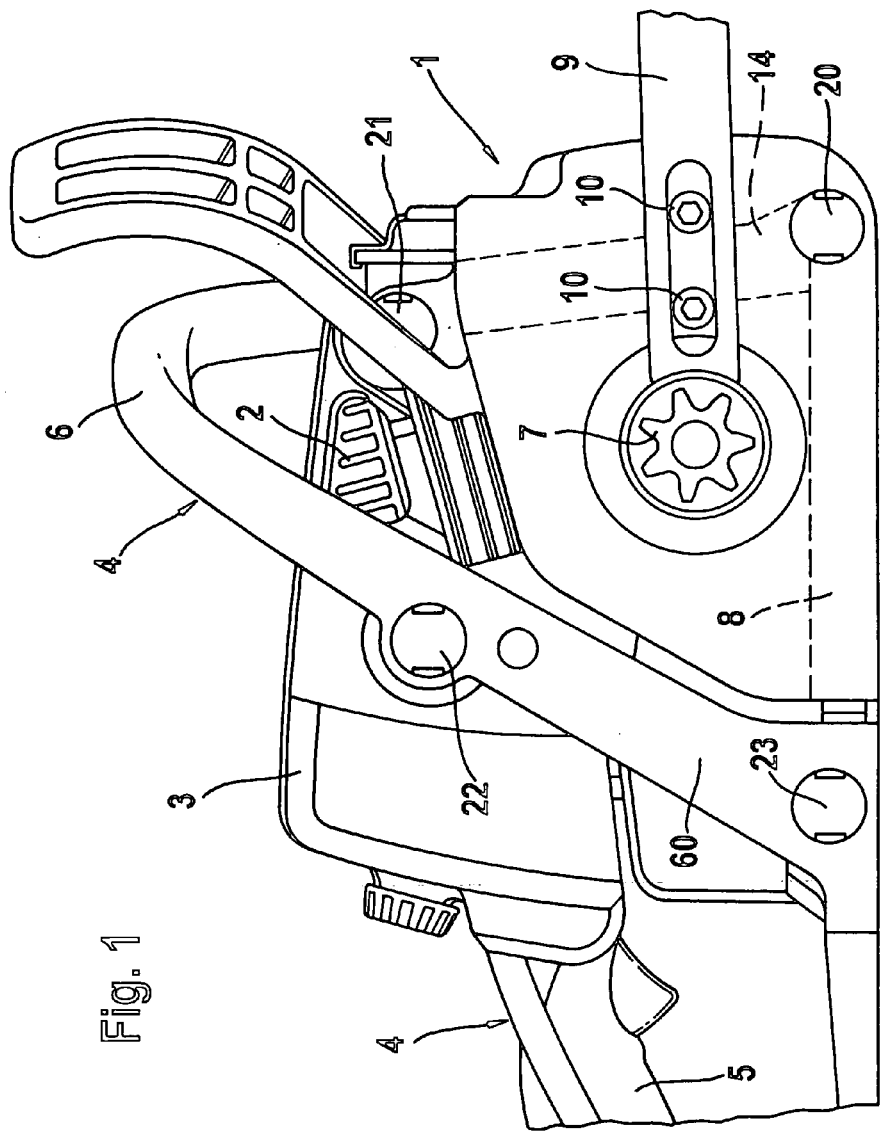
FIG. 1 shows a schematic side view of a chain saw.

FIG. 1 shows a schematic representation of a chain saw 1 as an example of a manually operated implement. The chain saw 1 has an internal combustion engine 2 which is positioned in a housing 3. The internal combustion engine 2 drives the saw chain (not illustrated in FIG. 1) via a pinion gear 7. In this arrangement, the saw chain runs around the guide bar 9. The guide bar 9 is fixed to the housing 3 by screws 10. A handle arrangement 4 comprising a rear handle 5 and a gripper bar 6 serve to operate the chain saw 1. The rear handle 5 extends along the side of the housing 3 facing away from the guide bar 9. The gripper bar 6 passes over the housing 3. The front end 14 of the gripper bar 6 is connected to the second, rear end 60 of the gripper bar 6 by means of a strut 8.

When the chain saw 1 is in operation, the moving parts cause vibrations which are transmitted to the handle arrangement 4. In order to dampen the vibrations, the housing 3 is fixed to the handle arrangement 4 by means of anti-vibration elements 20, 21, 22, 23. The inherent vibrations of the chain saw 1 lie in the range of the idle speed and increased vibrations can therefore occur when the internal combustion engine 2 is idling. This can be avoided by means of detuning and/or damping the inherent vibrations.

FIG. 2 shows a diagram in which vibration amplitude (a) is plotted against frequency (f). The inherent vibration of the chain saw 1 is plotted as the first characteristic curve 54. The maximum amplitude 58 of the first characteristic curve 54 corresponds to a frequency 56 which lies within a frequency range 13. Here the frequency range 13 corresponds in particular to the frequency range at idle. In order to reduce the vibration amplitude at idle, the inherent vibration of the chain saw 1 is detuned by increasing the spring rigidity of the anti-vibration element in such a manner as to produce the second characteristic curve 55 which is illustrated by means of the broken line in FIG. 2. The maximum amplitude 58 has been pushed up to a frequency 57 which lies beyond the frequency range 13. Within the frequency range 13, amplitude 59 is less at frequency 56 than amplitude 58. The fact that the inherent vibration is detuned only if the chain saw 1 is vibrating within the frequency range 13, i.e. in particular when the internal combustion engine 2 is idling, means that there are no high vibration amplitudes at higher frequencies.

FIG. 12 shows a diagram of vibration amplitude (a) plotted against frequency (f) during an increase in damping effect. The first characteristic curve 65 has an amplitude 67 at a frequency in the frequency range 13. The first characteristic curve 65 is produced in a first state of an anti-vibration element. Increasing the damping effect of the anti-vibration element at identical spring rigidity by switching from the first to a second state results in the second characteristic curve 66 and the amplitude drops to a second amplitude 68. At higher frequencies there is a reduction in the insulation effect at the second characteristic curve 66 since the amplitudes are higher than those occurring at the first characteristic curve 65.

An embodiment of an anti-vibration element with which the inherent vibration can be detuned in a frequency range 13, in particular in the idle range, is shown in FIGS. 3 and 4. The anti-vibration element 24 is positioned between the housing 3 in which the internal combustion engine is positioned and the handle arrangement 4. The anti-vibration element 24 has an elastically deformable vacuum reservoir 69 which is designed as a bellows or corrugated sheath 17 in the embodiment illustrated. The corrugated sheath 17 comprises an elastic or flexible material such as rubber, for example, and is advantageously rotationally symmetrical. A vacuum unit or similar device may also be provided as the vacuum reservoir 69. The corrugated sheath 17 has peripheral folds 27 which permit the corrugated sheath 17 to be compressed. A first end 28 of the corrugated sheath 17 is fixed to the housing 3 and the second end 29 is connected to the handle arrangement 4. The interior 18 of the corrugated sheath 17 is connected to the intake duct 11 of the internal combustion engine 2 via a line 16. In this arrangement, the line 16 discharges downstream of a flow control element 12 mounted in the intake duct 11 in relation to the direction of flow 15 from an air filter to the internal combustion engine 2. The flow control element 12 is positioned in a carburetor 19. When the internal combustion engine 2 is under full load, the flow control element 12 is positioned roughly parallel to the direction of flow 12 as illustrated in FIG. 3 and hampers the flow in the intake duct 11 only very slightly. The pressure prevailing in the intake duct 11 is essentially the same as the pressure in the interior of the corrugated sheath 17. The anti-vibration element 24 is in its first position 25 in which it has only a very small spring and damping effect. The spring and damping effect results only from the damping and elasticity of the flexible outer wall of the corrugated sheath 17. In the first state 25 the anti-vibration element 24 has a first characteristic curve which may, for example, correspond to the characteristic curve 54 illustrated in FIG. 2 or the characteristic curve 65 illustrated in FIG. 12.

FIG. 4 shows the anti-vibration element 24 in a second state 26 in which it has a greater reinforcing and damping effect. The flow control element 12 of the carburetor 19 is located in a position in which it largely closes the intake duct 11. When the flow control device 12 is in this position, the internal combustion engine 2 is at idle. There is underpressure in the intake duct 11 downstream of the flow control element 12. This underpressure causes air to be drawn through the line 16 from the interior of the corrugated sheath 17. The corrugated sheath 17 contracts causing the folds 27 to lie close together. The close contact between the folds 27 creates increased friction at the folds 27. This in turn leads to an increased damping effect and, depending on the design, also to the reinforcement of the anti-vibration element in the second state 26. In the second position state 26 the anti-vibration element 24 has a second characteristic curve which may, for example, correspond to the characteristic curve 55 illustrated in FIG. 2 or the characteristic curve 66 illustrated in FIG. 12. The line 16 may, for example, be designed as a hose. It may, however, also be useful for the line 16 to be integrated into the housing/carburetor structure.

Figure 5:
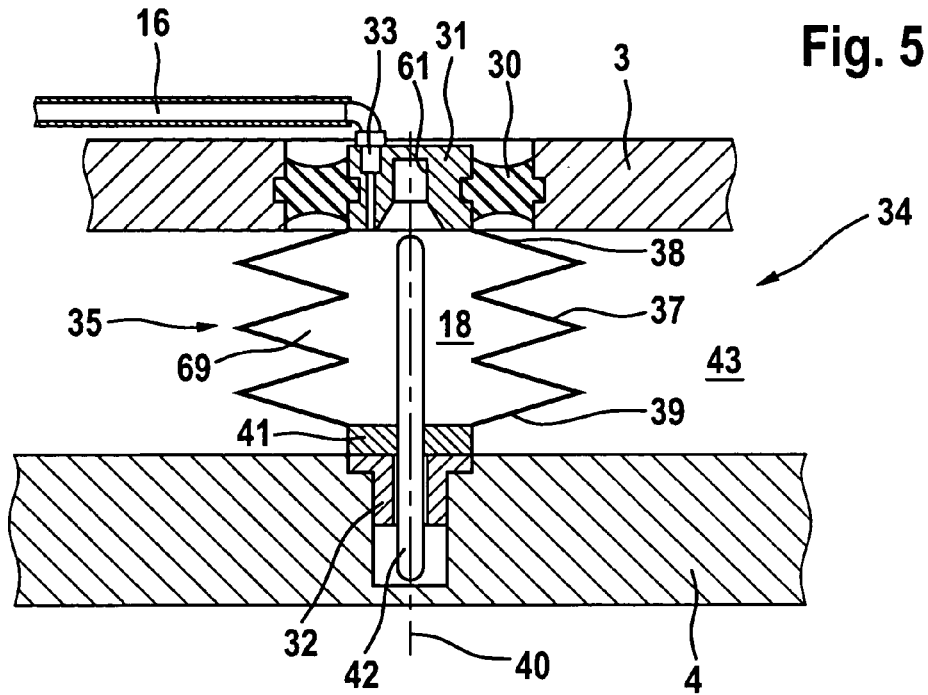
FIG. 5 shows a schematic representation of an anti-vibration element in a first state.
Figure 6:
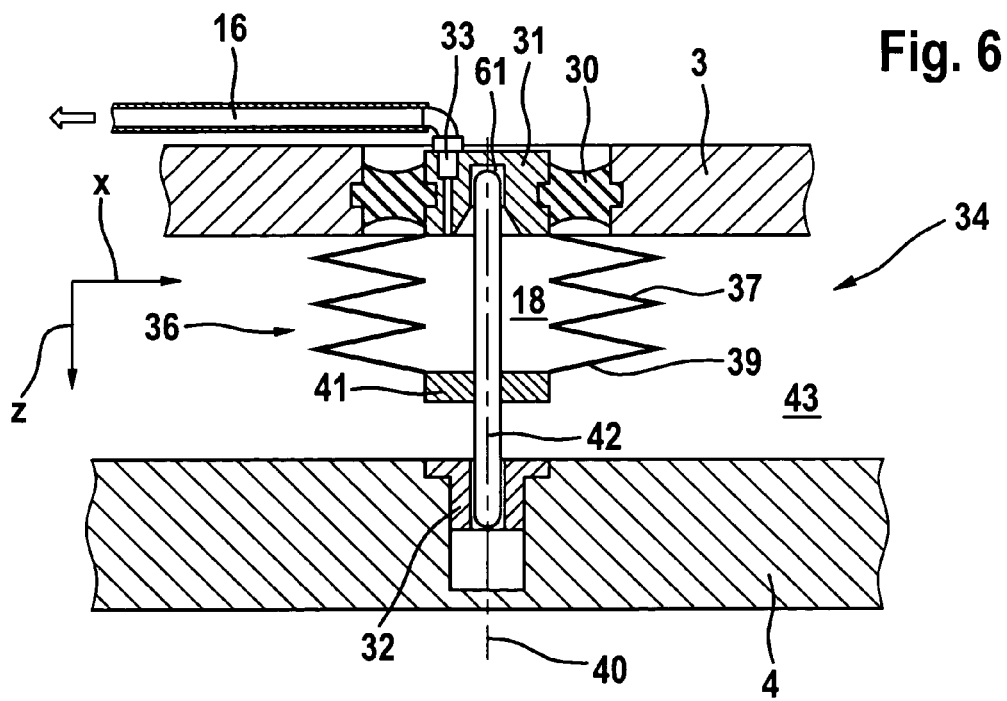
FIG. 6 shows the anti-vibration element illustrated in FIG. 5 in the second state.

FIGS. 5 and 6 show an embodiment of an anti-vibration element 34. The anti-vibration element 34 is positioned in a gap 43 between the housing 3 and the handle arrangement 4. The anti-vibration element 34 comprises a vacuum reservoir 69 in the form of a bellows corrugated sheath 37 and a bar 42. The bar 42 is mounted in a guide 32 on the handle arrangement 4 in such a manner that it is able to move in the direction of movement 40 of the corrugated sheath 37. In this arrangement, the direction of movement 40 refers to the direction in which the corrugated sheath 37 contracts when underpressure is applied to the line 16. The first end 38 of the corrugated sheath 37 opposite the guide 32 is fixed to an insert 31. The insert 31 is fixed in the housing 3 by a damping element 30 which is in particular positioned in a ring shape around the insert 31. A line 16 opens into the insert 31 at a connector 33. In this arrangement, the line 16 connects the interior 18 of the corrugated sheath 37 to the intake duct of the internal combustion engine. At its second end 39 the corrugated sheath 37 is fixed to the bar 42 by a coupling 41. In the first position state 35 of the anti-vibration element 34 shown in FIG. 5 in which the anti-vibration element 34 has a low spring and damping effect, the bar 42 simply projects into the gap 43 and is not connected to the handle arrangement 3. Formed in the insert 31 is a receiver 61 for the bar 42 which is positioned a distance from the bar 42. The spring and damping effect in the first state 35 is thus created by the corrugated sheath 37 alone, producing a non-rigid connection between the handle arrangement 4 and the housing 3 in each direction. In the first state 35 the anti-vibration element 34 has a first characteristic curve.

FIG. 6 shows the anti-vibration element 34 in the second state 36 which corresponds in particular to the internal combustion engine 2 at idle. The line 16 is connected to a vacuum source and has taken in air from the interior 18 of the corrugated sheath 37. Due to the shortening of the corrugated sheath 37, the second end 39 of the corrugated sheath 37 has moved towards the housing 3 in the direction of movement 40. The bar 42 has also been pushed by the coupling 41 towards the insert 31 and into the receiver 61 formed in the insert 31. Due to the mobility of the bar 42 there is a non-rigid connection between the housing and the handle arrangement in the direction of vibration (z) which is also the direction of movement 40. In all directions perpendicular to the direction of movement 40, i.e. including the direction of vibration (x) shown in FIG. 6, the housing 3 is connected to the handle arrangement 4 by the bar 42 such that a comparatively rigid coupling and thus a greater spring and damping effect is produced by the detuning of the inherent vibration of the chain saw 1 in the idle range. In the second state 36 the anti-vibration element 34 has a second characteristic curve.

A further embodiment of an anti-vibration element 44 is shown in FIGS. 7 to 9. The anti-vibration element 44 comprises a bellows or corrugated sheath 47 in the form of an elastically deformable vacuum reservoir 69, the first end 48 of which is fixed to the housing 3 and the second end 49 of which is fixed to a spring element. The spring element is designed as a leaf spring 50. In this arrangement, the second end 49 of the corrugated sheath 47 is connected to the second end 53 of the leaf spring 50. The first end 52 of the leaf spring 50 is fixed to the handle arrangement 4. The handle arrangement 4 is also fixed to the housing 3 by a coil spring 51 which represents a further anti-vibration element. In the first state 45 of the anti-vibration element 44 as illustrated in FIG. 7, the corrugated sheath 47 is uncontracted and guarantees a non-rigid connection to the handle arrangement 4 in all directions of vibration, thus resulting in a first characteristic curve. In this state, the spring and damping effect is achieved largely by the coil spring 51. The interior of the corrugated sheath 47 is connected via the line 16 to the intake duct 11 in which there is no underpressure since the flow control element 12 is open.

FIG. 8 shows the anti-vibration element 44 in the second state 46 in which the flow control element 12 largely closes the intake duct 11 and the underpressure causes the air to be drawn out of the corrugated sheath 47 and the folds of the corrugated sheath 47 to lie close together. The second end 49 of the corrugated sheath 47 has moved towards the housing 3 in the direction of movement 62. As a result, the second end 53 of the leaf spring 50 has also moved towards the housing 3. The leaf spring 50 is connected comparatively rigidly to the housing 3. The length of the leaf spring 50, however, results in lower spring and damping values in the directions of vibration (x) and (z) than in the direction of vibration (y) which lies perpendicular thereto and is illustrated in FIG. 9 in which the leaf spring 50 has a greater section modulus. Due to the connection via the leaf spring 50, the inherent vibration of the chain saw 1 is detuned differently for the three directions of vibration (x), (y) and (z) and, as a result, the second characteristic curve for the three directions of vibration (x), (y) and (z) is also different. This means that it is possible to achieve optimum adaptation of inherent vibrations to speed.

Instead of the leaf spring, it is also possible to use a coil spring, a rubber spring or another spring element. FIG. 10 shows an embodiment of the anti-vibration element 44 in which the corrugated sheath 47 is fixed to the handle arrangement 4 by a rubber spring 63 rather than by the leaf spring 50. FIG. 11 shows the connection of the corrugated sheath 47 to the handle arrangement 4 via a coil spring 64. Both the coil spring 64 and the rubber spring 63 produce the same damping effects in both directions of vibration (x) and (y) in the second state 46. Other damping elements may also be advantageous. Here the term damping element is used not only to describe a simple damping element, but also any element which leads to a reduction in amplitude in a predetermined frequency range due to detuning of the natural frequency.

Instead of the pressure downstream of the flow control element, it is also possible to use other vacuum sources such as the fluctuating crankcase pressure, for example.

FIG. 13 shows a schematic sectional view of a variant of the anti-vibration element 24 illustrated in FIGS. 3 and 4. The vacuum reservoir 69 is designed as a bellows or corrugated sheath 17. It may also usefully be designed as a vacuum unit. One end of the corrugated sheath 17 is connected to a guide cylinder 84 which is adjoined externally by a joint in the form of a ball-and-socket joint. The opposite end of the corrugated sheath 17 is connected to a connector 33 for connecting the interior of the corrugated sheath 17 to a vacuum source. The connector 33 also has a joint 75 in the form of a ball-and-socket joint. Adjacent to the connector 33 on the inside is a cylindrical filter element 73 which is inserted into the guide cylinder almost without play.

The guide cylinder 84 has a number of openings 85 as a result of which it is air permeable, as is the filter element 73. The interior 18 of the corrugated sheath 17 is filled between the wall of the corrugated sheath 17 and the filter element 73 or the guide cylinder 84 with a damping material 71 which in the embodiment illustrated takes the form of a granulated material 72. Another, for example viscous or elastic spring, damping material may also be used. In the arrangement illustrated, the filter element 73 lies between the filled interior 18 and the connector 33 which opens into the interior 18.

FIG. 14 shows the arrangement illustrated in FIG. 13 in the second position 26 in which underpressure is introduced into the interior 18 of the corrugated sheath 17 via the connection 33. The guide element 74 in the form of the filter element 73 is inserted completely into the guide cylinder 84, the granulated material 72 being compressed by the vacuum-controlled position of the corrugated sheath 17. The contact pressure of the granulated material 72 causes a damping of the relative movement of the two joints 75 which is greater than that exerted in position 25 as illustrated in FIG. 13. Any wear which may arise in the granulated material 72 due to friction is reliably kept away from the connector 33 by the filter element 73.

FIG. 15 shows an exploded perspective view of an embodiment of an anti-vibration element 24 which comprises a cylinder element 78, a clamping collar 79 and a vacuum reservoir 69 in the form of a bellows or corrugated sheath 17. Instead of the corrugated sheath 17, it may also be useful to use a vacuum unit. The inside of the clamping collar 79 and the outside of the cylinder element 78 form friction surfaces (76, 77) which cause frictional damping in the event of an axial movement of the cylinder element 78 in relation to the clamping collar 79. The reciprocal contact pressure between the friction surfaces (76, 77) is adjusted by means of the adjustable underpressure in the corrugated sheath 17. The corrugated sheath 17 is designed with reinforcements in such a manner that underpressure causes essentially axial deformation while avoiding radial deformation. In this arrangement, the corrugated sheath 17 acts on two legs (80, 81) of the clamping collar 79, thereby adjusting the expansion/clamping position of the clamping collar 79. To adjust the elasticity of the clamping collar 79, it has as an option a number of longitudinal slits 86. Positioned at one end of each the clamping collar 79 and the cylinder element 78 is a joint 75 in the form of a ball-and-socket joint. Forces may be introduced into the arrangement longitudinally only.

FIG. 16 shows a cross-sectional view of the arrangement illustrated in FIG. 15 in the assembled position. The corrugated sheath 17 is locked into appropriate holes (illustrated in FIG. 15) in the two legs (80, 81) of the clamping collar 79 in a positive fit. The clamping collar 79 surrounds the cylinder element 78 at least approximately completely. When underpressure is applied to the corrugated sheath 17 the two legs (80, 81) are moved towards one another, thereby increasing the clamping force between the clamping collar 79 and the cylinder element 78. The damping effect between the two components can be adjusted dependent on the underpressure. In order to avoid an excessive damping effect or blocking, tongues 87, 88 which limit the clamp travel are positioned in the area of each of the legs 80, 81.

The friction surfaces 76, 77 illustrated in FIG. 15 may have a surface which increases the friction coefficient and/or are made of a material pairing with an appropriate coefficient of friction.

FIG. 17 shows a variant of the arrangement illustrated in FIG. 15. An exploded perspective view illustrates the principal components of this embodiment of an anti-vibration element 24. The vacuum reservoir 69 is designed as a flat, plastic vacuum unit 70 which acts on a tie rod 100 attached to it. The vacuum unit 70 may also be made of sheet metal or a similar material. A retaining plate 89 is provided to fix the vacuum unit 70.

Part of the anti-vibration element 24 is a load-bearing body 94 with a longitudinally extending section 97 in which is positioned a central opening 95. A U-shaped leaf spring 91 also has a central opening 92 and is fixed in the load-bearing body 94. A U-shaped friction element 90 has a central elongated hole 93 which covers the openings 92 and 95 and is provided to fix the assembly to a separate retaining element 99 in a positive fit. The friction element 90 may, for example, be a metal plate or plastic element coated with a friction lining. When assembled, the two legs of the leaf spring 91 and the U-shaped friction element 90 engage with one another, the tie rod 100 passing through the openings (92, 95) and the elongated hole 93.

Due to the elongated hole 93, the friction element 90 can be moved along the elongated hole 93 in relation to the leaf spring 91. In this arrangement, the legs of the two U-shaped parts lie in layers one on top of the other in a laminate formation and form layered laminate friction plates (82, 83) with friction surfaces (76, 77).

A joint 75 in the form of a ball-and-socket joint is positioned on the base body 94 and on the retaining element 99 such that when assembled, as illustrated in FIG. 18, forces may only be introduced axially between the two joints 75. The vacuum unit 70 is held in the slit 96 in the load-bearing body 94 by means of the retaining plate 89. If the vacuum unit 70 is subjected to underpressure, the legs of the leaf spring 91 and the friction element 90 are pressed together by the tie rod 100 and the retainer 98, as a result of which an increased damping effect is created in the event of an axial relative movement. The retaining element 99 can be moved in the direction of the double-ended arrow 101 in relation to the load-bearing body 94 to create a damping effect.

In another longitudinal sectional view, FIG. 19 shows a version of the anti-vibration element 24 illustrated in FIG. 18. Positioned between the retainer 98 on the tie rod 100 and the section 97 of the load-bearing body 94 is a spring 102 by means of which the contact pressure exerted by the vacuum unit 70 on the leaf spring 91 and the friction element 90 can be adjusted. The view shown also illustrates that the U-shaped leaf spring 91 is held in a positive fit in an appropriately shaped recess of the load-bearing body 94, while the U-shaped friction element 90 is fixed in the retaining element 99 in the same manner.

The specification incorporates by reference the disclosure of German priority document DE 103 25 967.8 filed 7 Jun. 2003.

The present invention is, of course, in no way restricted to the specific disclosure of the specification and drawings, but also encompasses any modifications within the scope of the appended claims.

We claim:

1. A manually operated implement having an internal combustion engine for driving a tool, comprising:
a handle arrangement for guiding said implement; and
an anti-vibration element for connecting said handle arrangement to said internal combustion engine, wherein in at least one direction of vibration x, y, z and in a prescribed frequency range said anti-vibration element has a first characteristic curve in a first state and a second characteristic curve in a second state, wherein said anti-vibration element is adapted to be shifted between said first state and said second state, and wherein said anti-vibration element comprises an elastically deformable vacuum reservoir having an interior that is connected to a vacuum source.

2. An implement according to claim 1, wherein a respective joint is disposed on opposite sides of said anti-vibration element.

3. An implement according to claim 1, wherein said anti-vibration element is shiftable as a function of engine speed.

4. An implement according to claim 1, wherein said prescribed frequency range comprises a vibration frequency of said implement when said internal combustion engine is operating at idle.

5. An implement according to claim 1, wherein said vacuum reservoir is a bellows.

6. An implement according to claim 1, wherein said vacuum reservoir is embodied as a vacuum unit.

7. An implement according to claim 1, wherein said internal combustion engine has an intake duct, wherein a flow control element is disposed in said intake duct, and wherein said vacuum source of said intake duct is downstream of said flow control element.

8. An implement according to claim 5, wherein said anti-vibration element comprises a spring element.

9. An implement according to claim 8, wherein one end of said spring element is connected with an end of said bellows, and wherein another end of said bellows and said spring element are connected with said internal combustion engine or said handle arrangement.

10. An implement according to claim 8, wherein said spring element is at least one of a coil spring, a rubber spring, a leaf spring and a bar.

11. An implement according to claim 10, wherein said spring element is a bar, and wherein said bar is movably mounted in a direction of movement of said bellows.

12. An implement according to claim 11, wherein said anti-vibration element is disposed in a gap between a component connected with said internal combustion engine and a component connected with said handle arrangement, and wherein said bar bridges said gap when said anti-vibration element is in said second position.

13. An implement according to claim 1, wherein said interior of said vacuum reservoir is filled with a damping material.

14. An implement according to claim 13, wherein said damping material is a granulated material.

15. An implement according to claim 13, wherein a linearly guided guide element is provided inside said vacuum reservoir.

16. An implement according to claim 15, wherein said guide element is formed by a filter element, and wherein said filter element is disposed between said vacuum source and said interior of said vacuum reservoir.

17. An implement according to claim 1, wherein said anti-vibration element is provided with at least two contiguous friction surfaces, and wherein said vacuum reservoir is provided for a control of a contact pressure between said friction surfaces.

18. An implement according to claim 17, wherein said friction surfaces are formed by a cylinder element and a clamping collar that frictionally surrounds said cylinder element, and wherein said vacuum reservoir is disposed between two legs of said clamping collar.

19. An implement according to claim 2, wherein each of said joints is a ball-and-socket joint.

* * * * *